United States Patent Office 2,914,399
Patented Nov. 24, 1959

2,914,399

REMOVAL OF CERTAIN FISSION PRODUCT METALS FROM LIQUID BISMUTH COMPOSITIONS

Orrington E. Dwyer, Wading River, N.Y., and Herbert E. Howe, North Plainfield, and Edward R. Avrutik, Nixon, N.J., assignors to the United States of America as represented by the United States Atomic Energy Commission No Drawing. Application August 20, 1958
Serial No. 756,263

8 Claims. (Cl. 75—84.1)

The present invention relates to a process for selectively removing metals dissolved in a liquid bismuth composition. More particularly it relates to a method of selectively extracting certain fission product metals from a liquid nuclear fuel composition in which the nuclear fuel is uranium and the carrier or solvent is liquid bismuth.

Liquid metal fuel reactors in which the fuel is a solution of uranium in liquid bismuth have been proposed as a useful source of power. The principles of construction and operation of a liquid metal fuel reactor are described in Nucleonics, July 1954, volume 12, pages 11–42, and in the Proceedings of the First International Conference on the Peaceful Uses of Atomic Energy. A typical fuel which can be used for a liquid metal fuel reactor is a dilute solution of about 500–1000 parts per million by weight uranium in molten bismuth for use at a temperature in the range 400–550° C. In addition, up to 350 parts per million (by weight of bismuth) each of zirconium and magnesium are used as corrosion mass transfer inhibitors. As the reactor operates, fission products accumulate in the fuel. Some of these fission products are termed reactors poisons since they have large capture cross sections for neutrons and therefore reduce the number of neutrons available for producing fission.

In order to operate such a reactor economically, it is necessary that the irradiated fuel composition be processed periodically to render both the uranium and the bismuth free of neutron-absorbing fission products. A convenient and economic process is desirable because the cost of such processing is reflected directly in the cost of power from the reactor.

It is, therefore, an object of the present invention to provide an efficient and economical method of removing fission products from a liquid metal nuclear fuel composition. A principal object of the invention is to reduce the concentration of fission products in a solution of uranium in bismuth. A further object of the invention is to provide a method for removing certain metals preferentially from a solution of uranium in bismuth. Another object of the invention is to avoid high losses of uranium during decontamination of a uranium-bismuth nuclear fuel. Still another object of the invention is to provide a process for recovering bismuth substantially free of neutron-absorbing fission products. Other objects will become apparent from the description which follows.

The products of fission of a liquid metal fuel reactor in which the liquid metal is bismuth and the fuel is uranium may be classified into three main groups. All are present after the liquid metal fuel composition has been exposed to neutrons to cause fissions. They are:

(1) The volatile fission products consisting principally of krypton and xenon with trace amounts of bromine and iodine. In removing fission products from an irradiated nuclear fuel of the type described, the volatile fission products are generally removed first by passing the fuel composition through a degassing apparatus.

(2) The non-volatile fission products which form chlorides more stable than $UCl_3$, the most stable chloride of uranium. After the volatile fission products have been removed, this class of non-volatile fission products is removed from the fuel, by extracting them with a fused chloride salt mixture which may contain an oxidizing agent. A suitable carrier salt may be the ternary eutectic, $NaCl$—$KCl$—$MgCl_2$, and the oxidizing agent may be $BiCl_3$. Sufficient oxidant is added to the salt to form chlorides of the fission products which form chlorides more stable than $UCl_3$ leaving substantially all of the uranium and the remaining fission products in the molten bismuth. Processes of this type for removing these fission products are described in U.S. Patent No. 2,758,023 to Bareis and co-pending application Serial Number 511,810, filed May 27, 1955, for R. H. Wiswall.

(3) The non-volatile fission products which form chlorides less stable than $UCl_3$. These fission products are relatively unaffected by the oxidizing fused salt mixture and remain in the molten bismuth along with the uranium. The metals in this class include palladium, ruthenium, rhodium, selenium, tellurium, niobium and zirconium. The present invention is particularly adapted for the separation of this third group of fission products from liquid bismuth or liquid bismuth containing uranium dissolved therein. The term fission product or fission product metals as used hereinafter will refer to this third class of fission products, i.e. those which form chlorides less stable than $UCl_3$.

In the practice of this invention, we can preferentially extract fission products from liquid bismuth or from a dilute solution of uranium in liquid bismuth. We have found that these fission products can be preferentially extracted from liquid bismuth by contacting and mixing the liquid bismuth with very small amounts of zinc at a temperature in the range 400–500° C. At higher temperatures the zinc has an appreciable vapour pressure and will distill from the mixture. While the zinc may be mixed with the bismuth solution at temperatures lower than 400° C., it requires an inconveniently long time before a homogeneous melt is formed. The liquid bismuth-zinc composition is agitated to insure uniform distribution of the zinc, and may then be cooled to any temperature above its freezing point, i.e., at a temperature above that at which bismuth-zinc eutectic forms (255° C.). Cooling results in the precipitation of a solid zinc-rich phase containing the fission product elements. The solidified zinc phase is in the form of finely divided particles dispersed in the liquid bismuth phase. These zinc-phase particles, less dense than bismuth, rise slowly through the liquid bismuth to form a dross which can be skimmed off the surface of the liquid bismuth leaving the bismuth with a substantially reduced fission product content. Another convenient way of separating the solid zinc phase from the liquid bismuth is by filtering the melt through a porous compact of a finely divided inert material such as graphite. In some cases cooling over a relatively narrow temperature range is sufficient to form a zinc phase containing a high concentration of the fission products from the bismuth.

Before the liquid bismuth, now reduced in its fission product content, can be returned for use in the reactor, it must be treated to remove any residual zinc. Since zinc is soluble to the extent of approximately 2.7% by weight in liquid bismuth, there will always be some residual zinc which must be removed in order to produce a zinc-free bismuth product. Several methods for removing zinc from the bismuth are known. One method which can be used is distillation at about 550° C.–600° C. under vacuum to remove the excess zinc.

The concentration of zinc used in extracting the fission products from the molten bismuth is an important consideration in the efficient practice of our invention. In a reactor using 150 tons of bismuth, for example, it is apparent that only the necessary amount of zinc should be used for removing the fission products. Any excess zinc would represent another contaminant requiring additional processing to purify the bismuth. It is therefore, preferred to use only the minimal amount of zinc which will effectively remove the fission products from the molten bismuth phase.

We have found that effective removal of the fission products from the bismuth phase can be accomplished using hypo-eutectic compositions of zinc, i.e., less than 2.7% by weight of the bismuth. As little as .2% to 2.5% zinc by weight of the bismuth will effectively remove virtually all the fission product content from the liquid bismuth phase. Our experiments have shown that separation of the fission products cannot be accomplished by using less than .2% of zinc by weight of the bismuth, regardless of fission product concentration.

The practice of our invention will be more fully understood from the following examples in which all concentrations are expressed in terms of weight percent of bismuth. It is not intended to limit the scope of the invention to the details of these examples.

EXAMPLE I

This example illustrates the degree to which fission products can be removed from a liquid bismuth solution laden with these products. Two samples of bismuth, each containing fission products at concentrations as indicated in the first lines of Tables 1A and 1B were heated to 500° C. in a graphite crucible exposed to the atmosphere. The molten bismuth was then cooled to 450° C. at which point .5% zinc was added to one and 1.5% zinc was added to the other bismuth solution. The mixtures were agitated to insure the formation of a uniform composition. Cooling of these solutions resulted in the formation of a thin film of a zinc-rich dross on the surface of the liquid bismuth melt. Samples were taken of the liquid bismuth phase at the temperatures indicated in Tables 1A and 1B, and it was found that the concentrations of the fission product metals in the bismuth decreased with decreasing temperature. The samples were taken by immersing a closed-end tube through the dross formed at the liquid bismuth surface and into the bismuth solution. The immersed end of the tube was then broken against the crucible wall and a liquid bismuth sample drawn into the tube. The results using .5% and 1.5% zinc, respectively, are summarized in Tables 1A and 1B below.

Table 1A

| Temperature | Bismuth With 0.5% Zinc—Parts Per Million | | | |
|---|---|---|---|---|
| | Ruthenium | Palladium | Rhodium | Tellurium |
| (No Zn 500° C.) | 44 | 26 | 12 | 100 |
| 450° C. (Zn Added) | 31 | 31 | 9.5 | 8 |
| 400° C | 12 | 11 | 1.2 | <0.6 |
| 350° C | 2.4 | 4 | <0.5 | <0.6 |
| 300° C | 1.5 | 1.6 | <0.5 | <0.6 |
| 270° C | <1 | 0.9 | <0.5 | <0.6 |

Table 1B

| Temperature | Bismuth With 1.5% Zinc—Parts Per Million | | | |
|---|---|---|---|---|
| | Ruthenium | Palladium | Rhodium | Tellurium |
| (No Zn 500° C.) | 78 | 290 | 10 | 133 |
| 450° C (Zn Added) | 3.1 | 9 | <0.5 | <0.6 |
| 375° C | 3.8 | 12 | <0.5 | <0.6 |
| 350° C | | | | |
| 300° C | 3.6 | 10 | <0.5 | <0.6 |
| 270° C | 0.7 | 2.7 | <0.5 | <0.6 |

In the case where .5% zinc was used, the total fission product contamination was reduced from 182 parts per million to less than three parts per million. In the case where 1.5% zinc was used, the total fission product contamination was reduced from 511 parts per million at 500° C. to less than 4.5 parts per million at a temperature below 300° C.

In similar experiments with bismuth solutions of the individual fission products, we have separated each of those products using as little as .2% zinc. In these experiments no detectable quantity of the fission product remained in the bismuth.

The temperature at which the zinc is added to and separated from the bismuth melt is relatively unimportant insofar as removal of the fission products is concerned. For convenience, the zinc should be added at a temperature at which it will most rapidly dissolve in the bismuth. In most cases we have found that there is little advantage in separating the fission products at temperatures lower than about 350° C. as virtually all of the fission products, except zirconium, are extracted from the liquid bismuth phase at temperatures higher than about 350° C.

EXAMPLE II

The purpose of this experiment was to determine whether fission products could be preferentially separated from bismuth containing uranium dissolved therein, i.e., without removing the uranium. A quantity of bismuth was heated in a graphite crucible in air. Fission product elements and uranium in the amounts indicated in Table 2 below were added to the bismuth to form a solution. At 500° C., 0.3% zinc was added and the mixture agitated to form a homogeneous composition. It was noted that a dross formed at the surface of the bismuth. Samples of the liquid bismuth phase were taken, as in Example I, at the temperatures indicated in Table 2 and analyzed for their fission product content. The results are summarized below:

Table 2

| | As Added at 500° C., p.p.m. | Amount in Solution in Bi with 0.3% Zinc Added | | |
|---|---|---|---|---|
| | | 500° C., p.p.m. | 400° C., p.p.m. | 300° C., p.p.m. |
| Palladium | 60 | 35 | 39 | 3.0 |
| Ruthenium | 10 | 10 | 12 | |
| Tellurium | 20 | 3 | 3 | 1 |
| Selenium | 50 | <1 | <1 | <1 |
| Zirconium | 250 | 8 | <1 | <1 |
| Uranium | 1,000 | 170 | 130 | 85 |

It is noted that, as in the previous examples, the fission product concentration was reduced to a negligible value in the bismuth on addition of zinc. However, these results appeared to indicate that the uranium content in the bismuth was considerably decreased on addition of zinc. Further experiments were undertaken to ascertain whether the uranium was in fact being removed by the zinc, as we suspected that the loss of uranium was the result of oxidation by the air to which the solution was exposed rather than reaction with the zinc.

EXAMPLE III

The object of this experiment was to determine the effect of zinc on a solution of uranium in liquid bismuth when a non-oxidizing atmosphere was maintained.

Bismuth containing a known concentration of uranium was melted under vacuum at 500° C. The resultant solution was then mixed to insure the formation of a homogeneous melt. The melt was then allowed to stand for one hour at 500° C. after which it was filtered at about 500° C. under an atmosphere of argon. A sample of the filtrate was analyzed for uranium.

In a parallel experiment, essentially the same conditions were used but, in addition, 3% zinc was added to the solution of uranium in bismuth. Each sample was filtered under an atmosphere of argon at the several temperatures indicated in Table 3, and the bismuth filtrates analyzed for uranium. The results are summarized below.

Table 3

| Temperature | Concentration of Uranium (p.p.m.) in Bismuth Phase | |
|---|---|---|
| | 0% Zn | 3.0% Zn |
| 500° C. (No Zn) | 512 | 568 |
| 500° C. (Zn Added) | 504 | 524 |
| 425° C | | |
| 350° C | 460 | 504 |
| 300° C | 400 | 456 |

By comparison with the experiment using no zinc, it is apparent that the zinc has relatively little affinity for uranium in a liquid bismuth phase as compared to the ability of zinc to remove fission products. The excessive loss of uranium from the bismuth phase in Example II was evidently the result of the oxidation of the uranium by air to which the sample was continuously exposed. It is also apparent from a comparison of the results of the experiments summarized in Tables 2 and 3 that the fission products can be selectively and virtually quantitatively removed from the liquid bismuth containing uranium dissolved therein by conducting the separation in a non-oxidizing atmosphere, i.e., one in which the uranium cannot react chemically, such as by oxidation. Separation in an argon atmosphere or under vacuum has been found to be satisfactory. A nitrogen atmosphere should be avoided since the uranium may react to form uranium nitrides.

Oxidation of the uranium may also be prevented by incorporating in the bismuth solution small amounts of metal which forms oxides more stable than uranium oxides and whose solubility in liquid bismuth is relatively unaffected by addition of zinc. For example, addition of about 100 to 300 parts per million magnesium to the bismuth melt can reduce the oxidation of uranium to a minimum.

The concentration of uranium in the bismuth will be essentially unaffected if the fission products are extracted in the range 350–500° C. If the initial bismuth solution contains smaller amounts of uranium than about 500 parts per million, the temperature at which the fission products can be preferentially removed, without affecting the uranium concentration, can be lower.

The solubility of uranium in bismuth should be taken into consideration in using this invention. Care should be taken to avoid exceeding the solubility of uranium in bismuth in all steps of the process.

Effective separation fo the fission products may take place without cooling the resultant melt. See, for example, Table 1B which shows that virtually all of the fission products are extracted from the liquid bismuth at 450° C. without cooling. In general, however, it is desirable to cool the bismuth-zinc melt to a temperature slightly above its freezing point. The advantage of cooling is that the efficiency of extraction is improved.

In separating zirconium from a solution of uranium in bismuth, most effective separation is obtained by cooling to a temperature in the range 270°–300° C. At temperatures above 300° C. we have found that the concentration of uranium and zirconium in a solution of these metals in liquid bismuth is substantially unaffected by the addition of zinc.

While we do not wish to be bound by any theory or mechanism, it is believed that preferential extraction of the fission products occurs as the result of the formation of high melting zinc intermetallic compounds and that these intermetallic compounds are preferentially soluble in the zinc phase.

Since many embodiments might be made in the present invention and since many changes might be made in the embodiment described, it is to be understood that the foregoing description is to be interpreted as illustrative only and not in a limiting sense.

We claim:

1. A method of purifying a solution of uranium in liquid bismuth containing at least one metal selected from the group consisting of selenium, tellurium, palladium, ruthenium, rhodium, niobium, and zirconium which comprises contacting and mixing said solution in an inert atmosphere with zinc to form a homogeneous melt, allowing a solid zinc phase to form and separating said zinc phase containing said metal.

2. A method of purifying a solution of uranium in liquid bismuth containing at least one metal selected from the group consisting of selenium, tellurium, palladium, ruthenium, rhodium, niobium and zirconium which comprises contacting and mixing said solution in an inert atmosphere to form a homogeneous melt, cooling said composition to form a phase containing zinc and said metal and separating said phase from the liquid bismuth.

3. A method of purifying a solution of uranium in liquid bismuth containing a metal selected from the group consisting of selenium, tellurium, palladium, ruthenium, rhodium and niobium which comprises contacting and mixing said solution with zinc in an inert atmosphere to form a homogeneous melt and, at a temperature in the range of about 300° C. to 500° C., separating a phase containing zinc and said metal.

4. A method of purifying a solution of uranium in liquid bismuth containing a metal selected from the group consisting of selenium, tellurium, palladium, ruthenium, rhodium, and niobium which comprises contacting and mixing said solution in an inert atmosphere with a hypoeutectic concentration of zinc and, at a temperature in the range of about 300° C. to 500° C., separating a phase containing zinc and said metal.

5. A method of purifying a solution of uranium in liquid bismuth containing a metal selected from the group consisting of selenium, tellurium, palladium, ruthenium, rhodium, and niobium which comprises contacting and mixing said composition with .2–2.5% zinc by weight bismuth in an inert atmosphere at a temperature in the range 350–500° C. and separating a phase containing zinc and said metal.

6. A method of purifying a solution of uranium and zirconium in liquid bismuth containing a metal selected from the group consisting of selenium, tellurium, palladium, ruthenium, rhodium and niobium which comprises contacting and mixing said solution with zinc in an inert atmosphere to form a homogeneous melt and, at a temperature in the range of about 300° C. to 500° C., separating a phase containing zinc and said metal.

7. A method of purifying a solution of uranium in liquid bismuth containing zirconium which comprises contacting and mixing said solution with zinc in an inert atmosphere to form a homogeneous melt and, at a temperature in the range 270° C. to 300° C., separating a solid zinc phase containing said zirconium.

8. A method of purifying a solution of uranium in liquid bismuth containing zirconium which comprises contacting and mixing said solution in an inert atmosphere with a hypo-eutectic concentration of zinc and, at a temperature in the range 270° to 300° C., separating a solid zinc phase containing said zirconium.

References Cited in the file of this patent

UNITED STATES PATENTS

| 2,721,813 | Holmberg | Oct. 25, 1955 |
| 2,758,023 | Bareis | Aug. 7, 1956 |
| 2,771,357 | Wroughton | Nov. 20, 1956 |
| 2,778,730 | Spedding et al. | Jan. 22, 1957 |